US007962787B2

(12) United States Patent
Camilleri et al.

(10) Patent No.: US 7,962,787 B2
(45) Date of Patent: Jun. 14, 2011

(54) SYSTEM AND METHOD FOR PRESERVING PROCESSOR MEMORY DURING POWER LOSS

(75) Inventors: Paul M. Camilleri, Brownstown, MI (US); Jerry A. Gohl, Howell, MI (US)

(73) Assignee: Robert Bosch GmbH, Stuttgart (DE)

( * ) Notice: Subject to any disclaimer, the term of this patent is extended or adjusted under 35 U.S.C. 154(b) by 501 days.

(21) Appl. No.: 12/022,005

(22) Filed: Jan. 29, 2008

(65) Prior Publication Data
US 2009/0193278 A1    Jul. 30, 2009

(51) Int. Cl.
*G06F 11/00* (2006.01)
(52) U.S. Cl. .............................. 714/24; 714/14; 323/282
(58) Field of Classification Search ................. 714/24, 714/14; 323/282
See application file for complete search history.

(56) References Cited

U.S. PATENT DOCUMENTS

| 4,414,623 A | 11/1983 | Davis et al. |
| 4,422,163 A | 12/1983 | Oldenkamp |
| 4,659,942 A * | 4/1987 | Volp ................................. 307/19 |
| 4,777,626 A * | 10/1988 | Matsushita et al. ............ 365/226 |
| 4,941,001 A | 7/1990 | Potucek |
| 5,237,699 A * | 8/1993 | Little et al. ....................... 714/23 |
| 5,577,195 A * | 11/1996 | Gochi .............................. 714/22 |
| 5,734,204 A * | 3/1998 | Sobue ............................. 307/65 |
| 5,742,800 A | 4/1998 | Forehand |
| 5,784,629 A * | 7/1998 | Anderson et al. ............... 713/340 |
| 5,821,734 A | 10/1998 | Faulk |
| 5,886,561 A * | 3/1999 | Eitan et al. ....................... 327/408 |
| 5,973,968 A | 10/1999 | Schu et al. |
| 5,977,750 A * | 11/1999 | Ng et al. .......................... 320/132 |
| 5,993,039 A | 11/1999 | Crill |
| 6,215,279 B1 * | 4/2001 | Rakovski et al. ............... 320/135 |
| 6,236,226 B1 * | 5/2001 | Hagiwara ........................ 324/771 |
| 6,377,028 B1 * | 4/2002 | Armstrong et al. ............ 320/136 |
| 6,404,163 B1 | 6/2002 | Kapsokavathis et al. |
| 6,586,911 B1 | 7/2003 | Smith et al. |
| 6,601,181 B1 * | 7/2003 | Thomas .......................... 713/340 |
| 6,687,627 B1 | 2/2004 | Gunn et al. |
| 6,704,633 B2 | 3/2004 | Prakash et al. |
| 6,727,708 B1 | 4/2004 | Dougherty et al. |
| 6,753,673 B2 | 6/2004 | Shiue et al. |

(Continued)

FOREIGN PATENT DOCUMENTS

EP           0473113        3/1992

OTHER PUBLICATIONS

PCT/US2008/076521 International Search Report and Written Opinion, 12 pages, dated Dec. 23, 2008.

*Primary Examiner* — Scott T Baderman
*Assistant Examiner* — Loan Truong
(74) *Attorney, Agent, or Firm* — Michael Best & Freidrich LLP

(57) ABSTRACT

A method, and a system of using the method, of preserving memory of a processor powered by an external source. The method includes determining a drop in a first power to be supplied to the processor, generating a reset signal when the drop falls below a threshold, supplying a second power from a power store to the processor based on the reset signal, and holding the reset signal until the first power rises above the threshold.

16 Claims, 3 Drawing Sheets

U.S. PATENT DOCUMENTS

| | | |
|---|---|---|
| 6,787,936 B2 * | 9/2004 | Nitta et al. .................. 307/64 |
| 6,943,463 B2 * | 9/2005 | Goerke et al. .............. 307/66 |
| 6,957,314 B2 | 10/2005 | Beckert et al. |
| 7,085,946 B2 * | 8/2006 | Yokoyama et al. ........ 713/322 |
| 7,091,701 B2 | 8/2006 | Turner et al. |
| 7,099,991 B2 | 8/2006 | Beckert et al. |
| 7,100,080 B2 | 8/2006 | Howe |
| 7,127,228 B2 * | 10/2006 | Chang et al. ............ 455/343.1 |
| 7,394,172 B2 * | 7/2008 | Anderson et al. ........... 307/130 |
| 7,523,321 B2 * | 4/2009 | Nikazm et al. .............. 713/300 |
| 2003/0120411 A1 | 6/2003 | Prakash et al. |
| 2003/0212921 A1 | 11/2003 | Howe |
| 2005/0044306 A1 | 2/2005 | Beckert et al. |
| 2005/0055498 A1 | 3/2005 | Beckert et al. |
| 2005/0195544 A1 * | 9/2005 | Fung ......................... 361/93.1 |

* cited by examiner

SYSTEM AND METHOD FOR PRESERVING PROCESSOR MEMORY DURING POWER LOSS

BACKGROUND

Embodiments of the invention include a system for preserving processor memory during power loss.

When a circuit is disconnected such as in a blown fuse situation, or shorted due to ground faults, it can lead to a power loss. During a power loss, microprocessors are generally unable to maintain their outputs and memory contents. Microprocessors are subsequently reset resulting in loss of outputs and memory.

Typical solutions to power loss problems include using multiple surface mount devices ("SMD") such as capacitors or a single, very large value, through-hole aluminum electrolytic capacitor at a voltage regulator supply input. These solutions are generally costly and require a relatively large amount of printed circuit board ("PCB") area. For example, using single, very large value, through-hole aluminum electrolytic capacitors involves manual capacitor insertions and wave soldering processes, which increases the cost of manufacturing such circuits. For another example, using multiple SMD's requires ensuring the SMD are accurately oriented and properly soldered to corresponding PCB's, which requires additional manual or automatic optical inspection ("AOI") and thus the use of additional PCB area to avoid possible shadowing effects associated with AOI.

SUMMARY

One purpose of the invention is to allow outputs of a voltage regulator to maintain a minimal output voltage such that integrity of a random access memory ("RAM") portion of a microprocessor can be preserved during a battery dropout event. Such events can occur in an automotive environment. Many automobile manufacturers require that electronic modules manufactured by component suppliers be designed to provide a solution to such events.

In one embodiment, the invention provides a method of preserving memory of a processor configured to be powered by an external source. The method includes determining a drop in a first power to be supplied to the processor, and generating a reset signal when the drop falls below a threshold. The method also includes supplying a second power from a power store to the processor based on the reset signal, and holding the reset signal until the first power rises above the threshold.

In another embodiment, the invention provides a circuit for preserving memory of a processor. The circuit includes a voltage regulator, a switch, and a comparator. The voltage regulator is configured to receive a first power from an external source, to provide power to the processor based on the first power, to determine a level of the first power supplied to the processor, and to generate a reset signal when the level of the first power drops below a threshold. The switch is coupled to the voltage regulator, and is configured to be activated based on the reset signal, and to transfer a second power to the processor via the voltage regulator. The comparator is coupled to the switch, and is configured to compare the first power and the threshold, and to hold the reset signal until the first power rises above the threshold.

In yet another embodiment, the invention provides a method of preserving memory of a processor. The method includes supplying a first power to the processor, and storing at least a portion of the first power in a store. The method also includes determining a drop in the first power to be supplied to the processor, generating a reset signal when the drop falls below a threshold, and coupling the store to the processor when the reset signal is active. The method also includes supplying a second power from the store to the processor, and holding the reset signal at an active level until the first power rises above the threshold.

In yet another embodiment, the invention provides a circuit for preserving memory of a processor. The circuit includes a voltage regulator, a store, a switch, and a comparator. The voltage regulator is configured to receive a first power from an external source, to provide power to the processor based on the first power, to determine a level of the first power supplied to the processor, and to generate a reset signal when the level of the first power drops below a threshold. The store is configured to store auxiliary power. The switch is configured to couple the store to the voltage regulator when the reset signal is activated, and to transfer a second power from the store to the processor via the voltage regulator. The comparator is coupled to the switch, and is configured to compare the first power and the threshold, and to hold the reset signal until the level of the first power rises above the threshold.

In yet another embodiment, the invention provides a method of preserving an output of a processor. The method includes switching in a dedicated storage capacitor after a RESET signal (i.e., typically an active low signal) is generated based on sensing an input supply voltage and output voltage. After a RESET signal has been generated and fed to the processor, the processor enters a known state. However, a release of the RESET signal resets all outputs and data of the processor. The release of the RESET after the RESET signal has been generated results in loss of outputs and data of the processor. As such, the method also includes suppressing a release of the RESET signal until the input supply voltage has returned to a level at which processor outputs can be sustained.

The embodiments detailed herein thus provide solutions to control power being supplied to the processor and to suppress a RESET signal to the processor, and provide solutions to determine size of an onboard emergency power storage. In this way, the embodiments of the invention can reduce cost, reduce the PCB area required, reduce a number of factors affecting circuit performance, increase reliability, and provide better circuit performance. In one particular embodiment of the invention, rather than a series of three 330 uF SMD capacitors or a single 1000 uF through-hole-package aluminum electrolytic capacitor, a single 33 uF SMD capacitor is used.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the drawings. However, no specific meaning is implied or should be inferred simply due to the use of capitalization. Thus, the claims should not be limited to the specific examples or terminology.

Embodiments of the invention provide a method and a system of preserving a voltage output of a microprocessor memory during power loss. In one particular form, the system includes a power supply voltage sensing circuit and an output voltage sensing circuit. When the power supply voltage sensing circuit senses that the power supply drops below a voltage threshold for a period of time, a RESET signal is generated to the microprocessor. A reset suppression circuit suppresses the release of the RESET signal until the supply voltage returns to an acceptable level.

Figure 1:
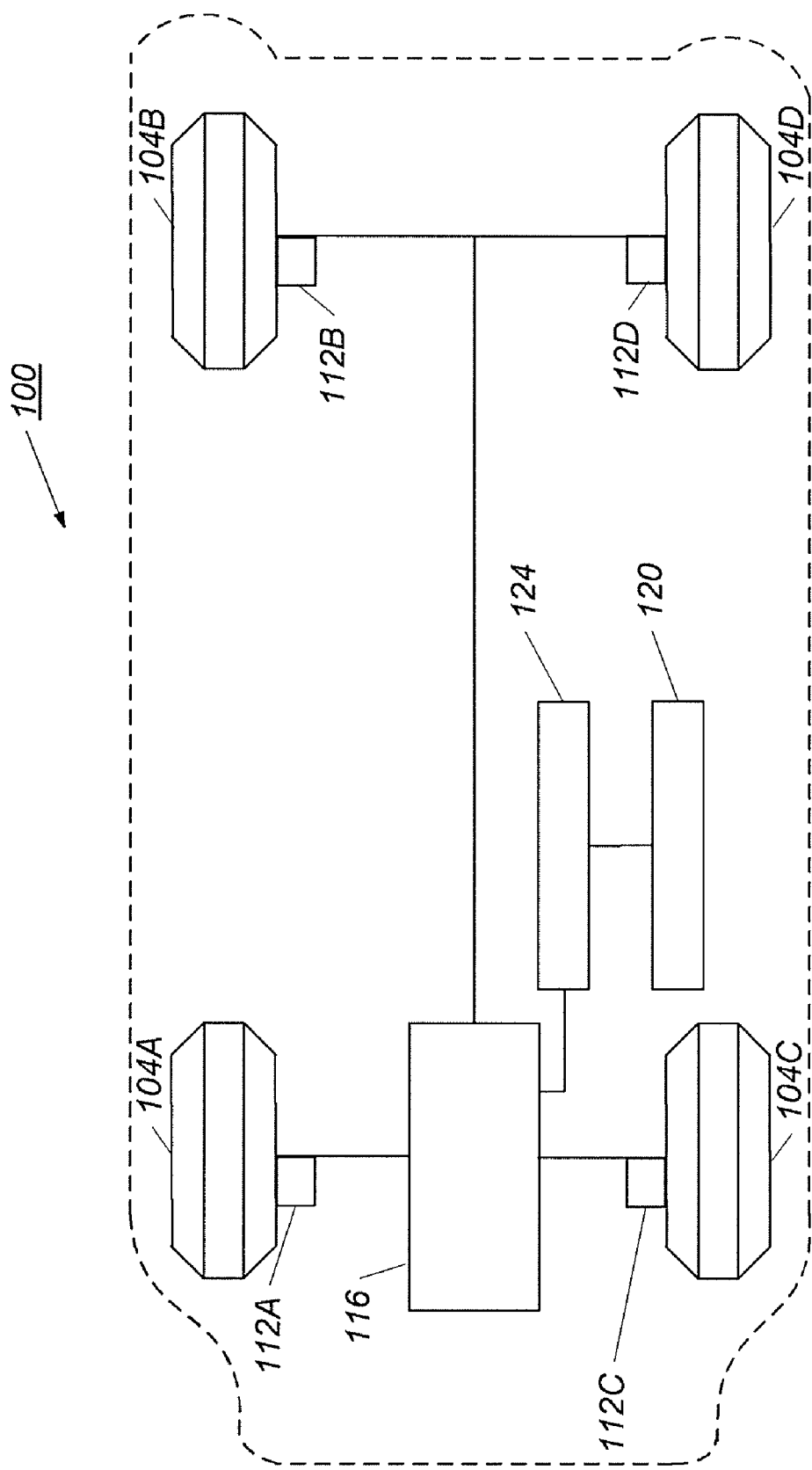
FIG. 1 shows a schematic plan view of an exemplary vehicle.

FIG. 1 shows a schematic plan view of an exemplary vehicle 100. The vehicle 100 has four wheels 104A, 104B, 104C, and 104D. The wheels 104A, 104B, 104C, and 104D are monitored by a plurality of wheel sensors 112A, 112B, 112C, and 112D. The wheel sensors 112A, 112B, 112C, and 112D are coupled to a processor, an electronic processing unit, or electronic control unit ("ECU") 116. Although FIG. 1 shows only the wheel sensors 112A, 112B, 112C, 112D, other types of sensors such as seat-adjuster sensor, restraint device sensors, sunroof sensors, and windshield wiper sensors can also be used in the vehicle 100. In the embodiment shown, a power supply 120 supplies power to the ECU 116 through a reset preserving module 124. Although the ECU 116 and the reset preserving module 124 are shown as discrete components, the ECU 116 and the reset preserving module 124 can be housed in an integrated circuit ("IC") chip, an ASIC, or the like. As detailed hereinafter, in some embodiments, depending on the amount of power being stored in the reset preserving module 124, some or all power storage components used in the reset preserving module 124 are SMDs. Although the reset preserving module 124 and the ECU 116 are shown to be components of the vehicle 100, it should be appreciated that the reset preserving module 124 is not limited to a vehicular environment, and that the reset preserving module 124 can also be used in conjunction with other microcontrollers or microprocessors.

Figure 2:
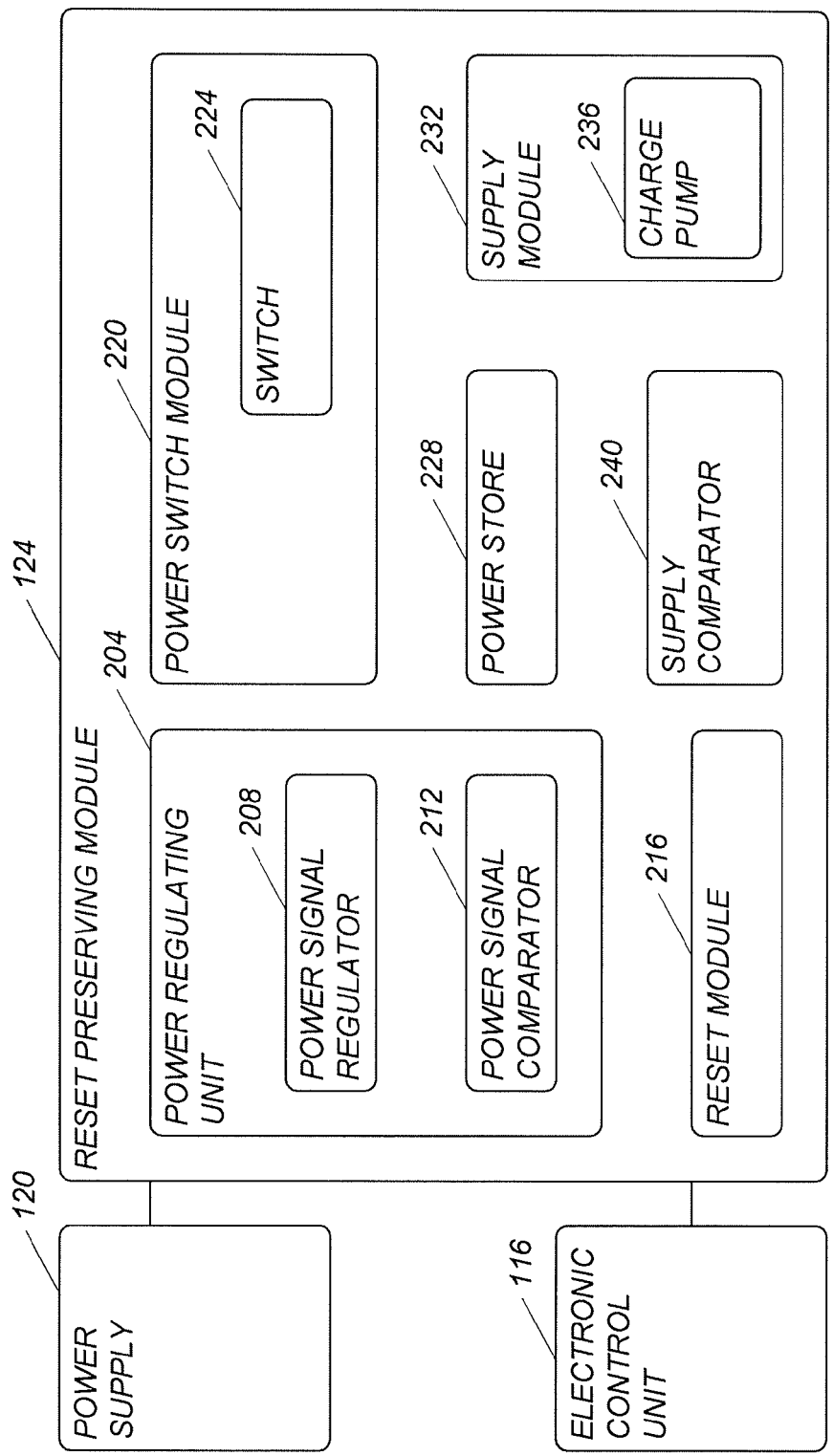
FIG. 2 shows an exemplary block diagram of a reset preserving module of FIG. 1.

FIG. 2 shows an exemplary block diagram of the reset preserving module 124 of FIG. 1, wherein like parts are referenced with like numerals. The power supply 120 supplies power to the ECU 116 through the reset preserving module 124. In the embodiment shown, the reset preserving module 124 includes a power regulating unit 204 coupled to receive a power signal from the power supply 120. It should be noted that, as used herein, a power signal can include electrical signals such as voltage signals and current signals. The power regulating unit 204 includes a power signal regulator 208 to regulate the power signal received, and a power signal comparator 212 to compare the power signal received with a power outage threshold. If the received signal is below the threshold, the reset preserving module 124 is considered disconnected. In a particular embodiment, the reset preserving module is designed to operate on a power signal of about 6 V, and the power outage threshold is about 4.6 V.

When the power signal comparator 212 determines that the power signal supplied to the reset preserving module 124 is below the outage threshold, the power signal comparator 212 generates or sends a reset signal to a reset module 216, which in turn holds the ECU 116 in a reset state. Meanwhile, the power signal comparator 212 also sends the reset signal to a power switch module 220 which activates a switch 224 to switch power supplied to the ECU 116 from the power supply 120 to a power store 228. In this way, the ECU 116 is powered by the power store 228. In the embodiment shown, a supply module 232 also draws power from the power supply 120 and charges the power store 228. In such a case, the supply module 232 limits an amount of inrush current flowing through the reset preserving module 124. In other embodiments, the supply module 232 draws power from a charge pump 236 to control or limit an amount of power that the supply module 232 can draw.

When power is being supplied to the ECU 116 by the power store 228, the power regulating unit 204 may deactivate the reset signal resulting in loss of memory contents or data at the ECU 116. To prevent the power regulating unit 204 from deactivating the reset signal, the reset preserving module 124 includes a supply comparator 240 to generate and transmit a second reset signal to the reset module 216. In this way, the reset signal supplied to the ECU 116 remains at an activated state until the power signal from the power supply 120 returns to a predetermined level.

Figure 3:
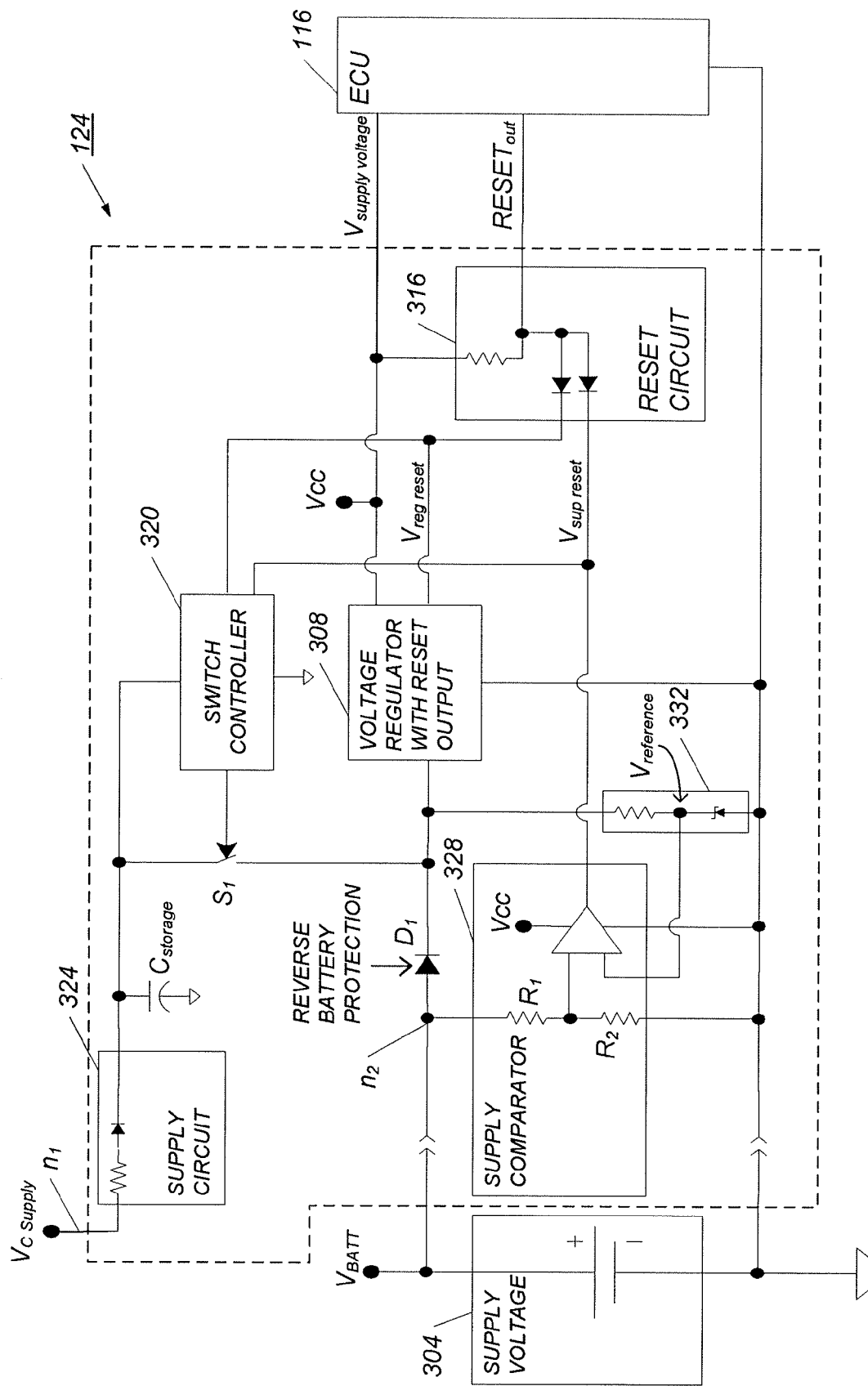
FIG. 3 shows an exemplary schematic of a reset preserving module of FIG. 1

FIG. 3 shows an exemplary schematic of the reset preserving module 124 of FIG. 1 and FIG. 2. In embodiment shown, the power signal as discussed earlier with respect to FIG. 2 is in the form of a voltage signal. Also as noted before, a voltage supply 304 supplies power to the reset preserving module 124 which relays the power to the ECU 116, detailed hereinafter. During normal operation, the voltage supply 304 is connected to a voltage regulator 308 via a reverse battery protection diode $D_1$. The voltage regulator generates a supply voltage signal $V_{CC}$ or $V_{supply\ voltage}$ to the ECU 116. The voltage regulator 308 can be implemented with designs such as linear, switch mode power supply (i.e. either/or buck, boost), or a combination of two classes (for example, a buck/boost circuit feeding a linear regulator). Furthermore, in some embodiments, an external capacitor (not shown) is connected to the supply voltage $V_{CC}$ to help provide nearly instantaneous and stable current to the ECU 116.

When the voltage supply 304 fails to supply the required voltage signal or is disconnected from the reset preserving module 124 for some reason, the voltage regulator 308 no longer receives the required voltage signal. As a result, the voltage regulator 308 is unable to maintain the supply voltage signal required by the ECU 116. Particularly, when the supply voltage signal falls below a predefined voltage threshold need for the ECU 116 to operate properly, the voltage regulator 308 generates a reset signal, $V_{reg\ reset}$, which is generally an active low signal.

Once generated, the voltage regulator 308 then sends the reset signal, $V_{reg\ reset}$, a reset circuit 316. The reset circuit 316 also receives a below-threshold supply voltage from the voltage regulator 308. When these two signals are received, the reset circuit 316 asserts a $RESET_{out}$ signal to the ECU 116. When the ECU 116 receives $RESET_{out}$ signal, the ECU 116 enters a reset state, which is a known ECU state. When the RESET$_{out}$ signal is active, and when the ECU 116 is in the reset state, current drawn by the ECU 116 is reduced or minimized.

The voltage regulator 308 is also connected to a switch controller 320 via the reset signal, V$_{reg\ reset}$. In the embodiment shown, the switch controller 320 closes or activates a switch S$_1$ when the reset signal is active. When the switch controller 320 closes or activates the switch S$_1$, the switch controller 320 also connects a capacitor C$_{storage}$ to the voltage regulator 308. In this way, the capacitor C$_{storage}$ supplies its stored energy or power to the voltage regulator 308 in the form of a voltage signal. The voltage regulator 308 then transmits the voltage signal to the ECU 116 such that memory contents of the ECU 116 can be maintained. In some embodiments, the reverse battery protection diode D$_1$ can be optional based on components used in the voltage regulator 308. In such cases, the switch S$_1$ is connected internally to the voltage regulator 308. The switch S$_1$ can be realized with semiconductor devices such as bipolar NPN or PNP, CMOS N or P channel, or DMOS N or P channel transistors, and the like.

A supply circuit 324, that is positioned upstream from the capacitor C$_{storage}$ and is also connected to a supply node n$_1$, is configured to charge the capacitor C$_{storage}$. Particularly, in the embodiment shown, the supply node n$_1$ is supplied with a voltage signal V$_{C\ Supply}$. In some embodiments, the supply node n$_1$ receives the voltage signal V$_{C\ Supply}$ from an internal charge pump circuit (not shown) to control or limit current loading of the reset preserving module 124. In other embodiments, the supply node n$_1$ receives the voltage signal V$_{C\ Supply}$ from sources external to the reset preserving module 124 such as the voltage supply 304. In this way, the supply circuit 324 can limit an inrush current and protect bond wires of the reset preserving module 124. In embodiments where short-to-ground fault prevention is required, the supply circuit 324 is also required to prevent discharging the capacitor C$_{storage}$. Conversely, if the short-to-ground fault prevention is only optional, the supply circuit 324 is not required to prevent discharging the capacitor C$_{storage}$. In some embodiments, the switch S$_1$ is connected directly to the output V$_{CC}$ of the voltage regulator 308. In such cases, the supply node n$_1$ is also connected to the output V$_{CC}$ of the voltage regulator 308.

When the capacitor C$_{storage}$ supplies a reduced amount of current to maintain the memory contents of the ECU 116 via the voltage regulator 308, the voltage regulator 308 may inadvertently recognize the voltage signal received from the capacitor C$_{storage}$ as a voltage signal from the voltage supply 304. As such, the voltage regulator 308 may deactivate the reset signal that keeps the ECU 116 in the known reset state. To keep the ECU 116 in the reset state and to avoid an inadvertent deactivation of the reset signal, the reset preserving module 124 uses a supply comparator 328 to generate and transmit an alternate reset signal, V$_{sup\ reset}$, to the reset circuit 316. Like the reset signal, V$_{reg\ reset}$, the alternate reset signal, V$_{sup\ reset}$, is also fed to the switch controller 320 to ensure that the switch S$_1$ is closed. Additionally, the alternate reset signal, V$_{sup\ reset}$, also ensures the RESET$_{out}$ signal remain active such that the ECU 116 remains in the reset state. In some embodiments, inputs to the supply comparator 328 are protected for conditions such as over-voltage or reverse polarity. External capacitors can be used to protect the reset preserving module 124 from electrostatic discharge ("ESD") during manufacturing, module assembly, or usage.

A reference voltage supply 332, often having a band-gap design, is coupled to the supply comparator 328 to provide a reference voltage, V$_{reference}$, such that the supply comparator 328 can generate the alternate reset signal, V$_{sup\ reset}$, to the reset circuit 316. When power delivered to the voltage regulator 308 originates from the capacitor C$_{storage}$, the reference voltage, V$_{reference}$ is greater than the voltage at node n$_2$. As such, the supply comparator 328 generates the alternate reset signal, V$_{sup\ reset}$. Conversely, when the power delivered to the voltage regulator 308 originates from the voltage supply 304, the reference voltage, V$_{reference}$ is less than the voltage at node n$_2$. In such cases, the supply comparator 328 deactivates the alternate reset signal, V$_{sup\ reset}$. In some embodiments, filter delays and hysteresis are required for generating signals V$_{reg\ reset}$ and V$_{sup\ reset}$ to prevent noise sources from inadvertently triggering a RESET$_{out}$ signal or triggering the switch controller 320 to activate the switch S$_1$.

EQN. (1) shows an exemplary equation that defines a minimum value for the capacitor C$_{storage}$.

$$C_{storage_{min}} = \frac{I_{totals\ supply} \cdot T_{supply\ loss}}{V_{supply\ drop}} \quad (1)$$

wherein C$_{storage\ min}$ is a minimum capacitance for the capacitor C$_{storage}$. Depending on an initial tolerance, construction (for example, package and dielectric), life de-rating and environmental conditions the capacitor, the value of C$_{storage\ min}$ will be different. The value of I$_{total\ supply}$ is a total amount of current that is supplied from C$_{storage}$ when the switch S$_1$ is closed, which includes an amount of current supplied to the ECU 116, and amounts of current consumed by the switch controller 320, the reference voltage V$_{reference}$, the supply comparator 328, and the voltage regulator 308. A major factor in determining a value of I$_{total\ supply}$ is the amount of current supplied to the ECU 116. Therefore, if the amount of current supplied to the ECU 116 is reduced, the value of capacitor C$_{storage}$ is reduced. Although there is a current loss due to the capacitor C$_{storage}$ self leakage, if a quality dielectric is used, the self leakage is generally insignificant. The value of T$_{supply\ loss}$ is a maximum time or duration required by the ECU 116 to maintain its memory or other levels of performance according the ECU 116's original equipment manufacturer ("OEM") specification. The value of V$_{supply\ drop}$ is the difference between the voltage of the switch S$_1$ at activation and a minimum voltage output at the voltage regulator 308, V$_{CC}$, after a duration of T$_{supply\ loss}$. The value of V$_{supply\ drop}$ can be determined with EQN. (2) as follows.

$$V_{supply\ drop} = V_{C_{storage}(@t=0)} - V_{Voltage\ Regulator(@t=T_{supply\ loss})} - V_{drops} \quad (2)$$

wherein V$_{C_{storage}(@t=0)}$ is a voltage of the capacitor C$_{storage}$ when the switch S$_1$ is initially closed or activated, V$_{Voltage\ Regulator(@t=T_{supply\ loss})}$ is a required voltage output level of the voltage V$_{CC}$ of the voltage regulator 308 at time T$_{supply\ loss}$ or beyond, and V$_{drops}$ is a voltage drop or loss from the capacitor C$_{storage}$ to the voltage V$_{CC}$ through the voltage regulator 308. In some embodiments, current requirements of the ECU 116 to maintain a memory integrity or other desired performance determines a value of V$_{Voltage\ Regulator(@t=T_{supply\ loss})}$. Additionally, voltage drops across the switch S$_1$ and the voltage regulator 308 also determine a value of V$_{drops}$.

The value of the capacitor, C$_{storage}$, can be reduced by increasing the value of the denominator, V$_{supply\ drop}$, of EQN. (1). To increase the value of the denominator, V$_{supply\ drop}$, of EQN. (1), the respective values of V$_{Voltage\ Regulator(@t=T_{supply\ loss})}$ and V$_{drops}$ in EQN. (2) should be reduced, and/or the value of V$_{C_{storage}(@t=0)}$ should be increased. One way of increasing the value of V$_{C_{storage}(@t=0)}$ in EQN. (2) is discussed below. In some embodiments, since V$_{C_{storage}(@t=0)}$ is the voltage of the capacitor C$_{storage}$, a higher voltage at node n$_1$, which is connected to the supply circuit 324, results in a higher voltage across the capacitor, $C_{storage}$. As such, the node $n_1$ should be connected to the highest voltage available to the reset preserving module 124. In some embodiments, the highest voltage available to the reset preserving module 124 is generated by the charge pump 236 (of FIG. 2). An example of the charge pump 236 is a voltage doubler or tripler circuit based on signals generated by the voltage supply 304. As discussed earlier, the charge pump 236 can be integrated with the reset preserving module 124. In other embodiments, the node $n_1$, is connected to $V_{BATT}$ at the voltage supply 304. Furthermore, one way of decreasing the value of $V_{drops}$ of EQN. (2) is to reduce the voltage drops across the voltage regulator 308 and the switch $S_1$.

In some applications, the ECU 116 is kept fully functional for a predetermined period of time after the voltage supply 304 has been disconnected. For example, in an alternate embodiment (not shown), the ECU 116 can be kept fully functional by adjusting a trip point governing a voltage threshold beyond which the $V_{sup\ reset}$ signal is activated, and by modifying the corresponding reset circuit 316 and the switch controller 320 to use the $V_{sup\ reset}$ signal. In the embodiment shown, the trip point of the supply comparator 328 is determined by the values of resistors $R_1$ and $R_2$. To adjust the voltage threshold at which the $V_{sup\ reset}$ signal is generated, the values of resistors $R_1$ and $R_2$ are adjusted according to EQN. (3) as follows.

$$\frac{R_2}{R_1 + R_2} = \frac{V_{reference}}{V_{BATT}} \quad (3)$$

As such, if $V_{reference}$ is about 2.4 V, and $V_{BATT}$ is about 6.0 V, the value of $R_1$ is about 1.5 times the value of $R_2$. Similarly, if $V_{reference}$ is about 1.2 V, and $V_{BATT}$ is about 6.0 V, the value of $R_1$ is about 3 times the value of $R_2$. Furthermore, in such an alternate embodiment, the switch controller 320 is only controlled by the $V_{sup\ reset}$ signal.

In some embodiments, the reset preserving module 124 includes an optional internal watchdog function or module (not shown) to detect operating faults of the reset preserving module 124 or the ECU 116. When the internal watchdog function detects an operating fault, the internal watchdog function will also generate a $V_{reg\ reset}$ signal to reset the ECU 116 due to the detected operating fault. However, whether the $V_{reg\ reset}$ signal is generated based on a low supply voltage or an operating fault, a $V_{reg\ reset}$ signal generated will activate the switch $S_1$ that is intended for a low voltage supply. That is, with the embodiment as shown in FIG. 3, it is possible that both the watchdog function and the voltage regulator 308 will generate a $V_{reg\ reset}$ signal, which activates the switch $S_1$. As such, in an alternate embodiment (not shown), the reset circuit 316 of FIG. 3 is modified to ensure accurately activating the switch $S_1$ only due to a low supply voltage. In such a case, the reset circuit 316 of FIG. 3 has to ensure that both the $V_{reg\ reset}$ signal from the voltage regulator 308 and the alternate reset signal, $V_{sup\ reset}$ from the supply comparator 328 are active. When both the $V_{reg\ reset}$ signal from the voltage regulator 308 and the alternate reset signal, $V_{sup\ reset}$ from the supply comparator 328 are active, the reset circuit 316 generates an active $RESET_{out}$ signal. Subsequently, the reset circuit 316 will activate the switch $S_1$ through the switch controller 320.

Although the reset preserving module 124 as shown in FIG. 3 is generally implemented as an ASIC or an IC, the reset preserving module 124 can also be implemented with various circuit components in discrete circuitry on a circuit board. In this way, the reset preserving module 124 can be implemented relatively quickly. For example, an Infineon IC TLE4299GM can be used to implement the voltage regulator 308, the reference voltage supply 332, and the supply comparator 328 with external resistors $R_1$ and $R_2$. In such a case, the reverse battery protection diode $D_1$ for the voltage regulator 308 is optional. However, additional circuitry may be required to protect the supply comparator 328.

Various features and advantages of the invention are set forth in the following claims.

What is claimed is:

1. A method of preserving memory of a processor configured to be powered by an external source, the method comprising:
   determining a drop in a first power to be supplied to the processor;
   generating a first intermediate reset signal when the first power falls below a threshold;
   supplying a second power from a store to the processor based on the first intermediate reset signal;
   deriving a reference signal from the second power;
   comparing the reference signal with the first power;
   generating a second intermediate reset signal when the reference signal is greater than the first power;
   activating a reset circuit with at least one of the first intermediate reset signal and the second intermediate reset signal; and
   outputting a processor reset signal from the reset circuit.

2. The method of claim 1, wherein supplying a second power from a store comprises:
   activating a switch when the first intermediate reset signal is activated; and
   coupling the store to the processor.

3. The method of claim 1, wherein the store comprises a capacitor, the method further comprising charging the capacitor with a supply circuit.

4. The method of claim 1, further comprising deactivating the reset signal when the first power is above the threshold.

5. A circuit for preserving memory of a processor, the circuit comprising:
   a voltage regulator configured to receive a first power from an external source, to provide power to the processor based on the first power, to determine a level of the first power supplied to the processor, and to generate a first intermediate reset signal when the level of the first power drops below a threshold;
   a switch coupled to the voltage regulator, and configured to be activated based on the first intermediate reset signal, and to transfer a second power to the processor via the voltage regulator;
   a reference supply configured to receive the second power and to derive a reference signal from the second power;
   a comparator configured to generate a second intermediate reset signal when the level of the first power is below the reference signal; and
   a reset circuit configured to receive the first intermediate reset signal and the second intermediate reset signal and to output a processor reset signal based on at least one of the first intermediate reset signal and the second intermediate reset signal.

6. The circuit of claim 5, further comprising a switch controller configured to receive the first intermediate reset signal and to activate the switch.

7. The circuit of claim 5, further comprising a capacitor configured to store the second power and to deliver the second power to the processor.

8. The circuit of claim 7, further comprising a supply circuit configured to charge the capacitor.

9. A method of preserving memory of a processor, the method comprising:
supplying a first power to the processor from a power supply;
storing at least a portion of the first power from the power supply in a store;
determining a drop in the first power to be supplied to the processor;
generating a first intermediate reset signal when the first power falls below a threshold;
coupling the store to the processor when the first intermediate reset signal is active;
supplying a second power from the store to the processor;
deriving a reference signal from the second power;
comparing the reference signal with the first power;
generating a second intermediate reset signal when the reference signal is greater than the first power;
activating a reset circuit based on at least one of the first intermediate reset signal and the second intermediate reset signal;
outputting a processor reset signal from the reset circuit; and
holding the reset signal until the first power rises above the threshold.

10. The method of claim 9, wherein supplying a second power from the store comprises:
activating a switch when the processor reset signal is activated; and
coupling the store to the processor.

11. The method of claim 9 further comprising charging a capacitor with a supply circuit.

12. The method of claim 9, further comprising deactivating the reset signal when the first power is above the threshold.

13. A circuit for preserving an output of a processor, the circuit comprising:
a voltage regulator configured to receive a first power from an external source, to provide power to the processor based on the first power, to determine a level of the first power supplied to the processor, and to generate a first intermediate reset signal when the level of the first power drops below a threshold;
a store configured to store auxiliary power;
a switch configured to couple the store to the voltage regulator when the first intermediate reset signal is activated, and to transfer a second power from the store to the processor via the voltage regulator;
a reference supply configured to receive the second power and to derive a reference signal from the second power;
a comparator configured to generate a second intermediate reset signal when the level of the first power is below the reference signal; and
a reset circuit configured to receive the first intermediate reset signal and the second intermediate reset signal and to output a processor reset signal based on at least one of the first intermediate reset signal and the second intermediate reset signal.

14. The circuit of claim 13, further comprising a switch controller configured to receive the first intermediate reset signal and to activate the switch.

15. The circuit of claim 13, wherein the store comprises a capacitor configured to store the auxiliary power and to deliver the auxiliary power to the processor.

16. The circuit of claim 15, further comprising a supply circuit configured to charge the capacitor.

* * * * *